United States Patent

[11] 3,629,497

[72] Inventors Italo Soardi
 Pavia;
 Giancarlo Pagani, Milan, both of Italy
[21] Appl. No. 882,142
[22] Filed Dec. 4, 1969
[45] Patented Dec. 21, 1971
[73] Assignee Ates Componenti Elettronici S.p.A.
 Milan, Italy
[32] Priority Dec. 5, 1968
[33] Italy
[31] 24645 A/68

[54] STABILIZED POWER SUPPLY WITH DC VOLTAGE STEP-DOWN FOR TRANSISTORIZED TELEVISION RECEIVERS AND THE LIKE
7 Claims, 1 Drawing Fig.

[52] U.S. Cl..................................................... 178/7.3 R,
 178/DIG. 11, 315/27 TD, 323/23, 323/DIG. 1
[51] Int. Cl..................................................... H04n 5/44
[50] Field of Search............................................ 307/150;
 325/492, 494; 328/258, 259, 261, 262, 267;
 178/7.3 R, DIG. 11; 323/17, 22 T, DIG. 1, 23;
 315/27 TD

[56] References Cited
UNITED STATES PATENTS
| | | | |
|---|---|---|---|
| 3,350,629 | 10/1967 | Kirby.............................. | 323/22 T |
| 3,417,321 | 12/1968 | Clapp............................. | 323/22 T |
| 3,510,578 | 5/1970 | Bazin............................. | 232/22 T |

*Primary Examiner*—Robert L. Griffin
*Assistant Examiner*—George G. Stellar
*Attorney*—Karl F. Ross ABSTRACT: A rectified supply voltage from an AC utility outlet is chopped under the control of a recurrent flyback pulse from the horizontal sweep circuit of a television receiver with the aid of a normally blocked chopping transistor in series with an ancillary transistor, the two transistors being of like conductivity-type and having their bases conductively interconnected by a high-ohmic resistor. A trigger pulse is periodically applied between the emitter of the ancillary transistor and the base of the chopping transistor through a secondary winding of a transformer whose primary winding acts as an inductance of a smoothing network for the chopped supply voltage. A differentiation circuit connects the collector of the ancillary transistor to the emitter of the chopping transistor, a Zener diode in the input of the ancillary transistor stabilizing the system against fluctuations in driving voltage.

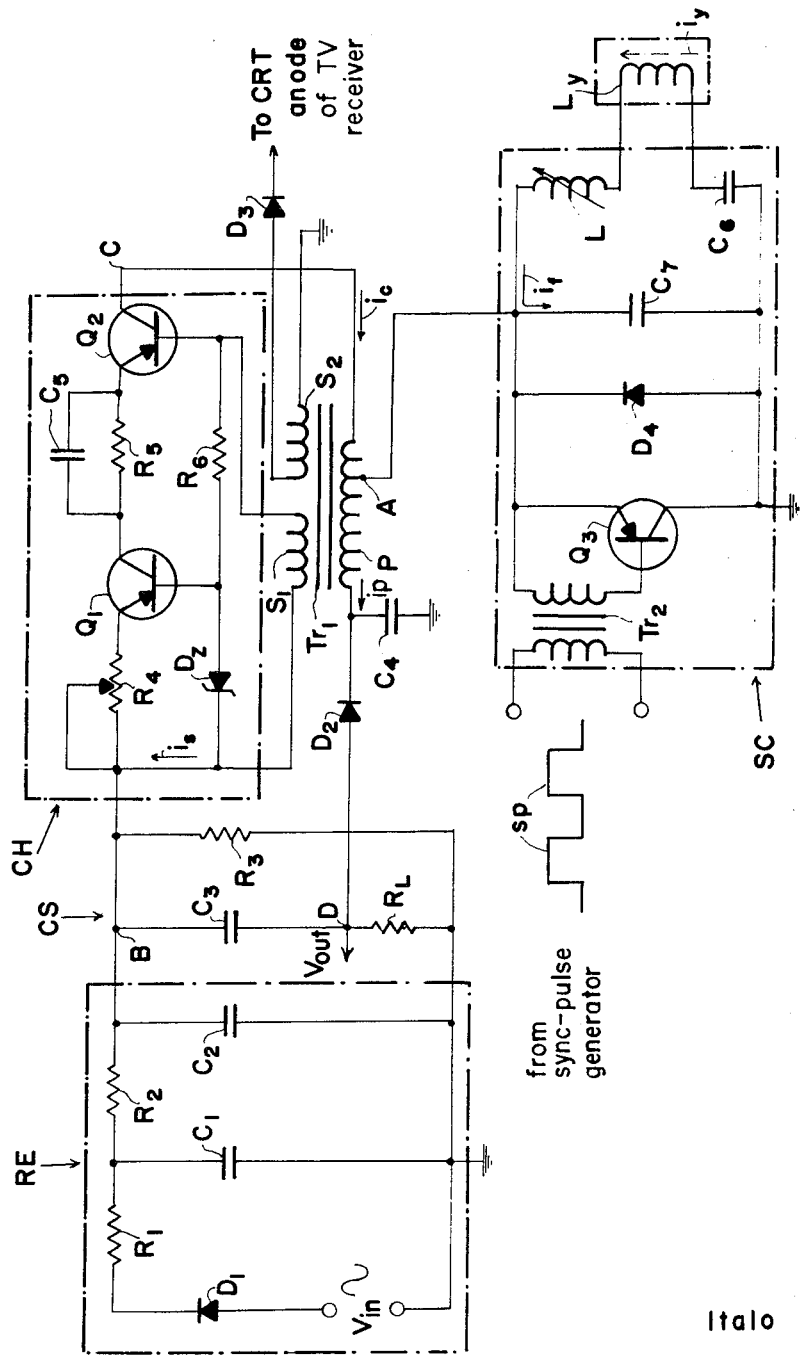

STABILIZED POWER SUPPLY WITH DC VOLTAGE STEP-DOWN FOR TRANSISTORIZED TELEVISION RECEIVERS AND THE LIKE

Our present invention relates to power-supply network designed to step down the voltage of an available AC or DC source of electric energy, such as an outlet from the utility mains of a building, for feeding a low voltage direct-current load.

In commonly owned applications Ser. No. 802,868, filed Feb. 27, 1969 by Vincenzo Sansone and Franco Gatti, and Ser. No. 845,709, filed July 22, 1969 by Eugenio Cavallari, there has been disclosed a power supply of this description specifically (though not exclusively) adapted to energize the various electrodes and the sweep circuits of a television receiver. Avoiding the need for a stepdown transformer, the supply network referred to includes a chopper in the form of one or more normally blocked transistors inserted between the input circuit and a load circuit, in combination with control means for periodically unblocking the transistor or transistors to generate a pulse train which is then integrated by an impedance path in the transistor output. When used in combination with a television system supplied thereby, the network advantageously derives its unblocking pulses from the flyback stroke on the horizontal sweep circuit.

An incidental advantage of the system described, aside from eliminating the need for a costly stepdown transformer, is the fact that any short circuit developing in the output of the chopper prevents the pulsing of the transistor or transistors which therefore remain blocked and cut off the power supply.

The system described and claimed in the above-identified Cavallari application, designated to eliminate the aforementioned drawback of an inconstant output voltage, includes a voltage-limiting device such as a Zener diode in the input circuit of the main chopping transistor or of an ancillary transistor connected in cascade therewith. Even when thus stabilized, however, the system is liable to develop transient voltages which could lead to an untimely breakdown of the chopping transistor.

The general object of our present invention, therefore, is to provide a further improvement in a system of this character designed to minimize the possibility of untimely conduction.

This object is realized, pursuant to the instant invention, by the provision of a chopper with a main transistor and an ancillary transistor wherein, however, the bases of the two transistors are conductively interconnected and wherein a trigger pulse is periodically applied to the emitter of the first or ancillary transistor whose collector is coupled, preferably through a differentiation circuit, to the emitter of the second or main transistor. This trigger pulse is advantageously derived from a secondary transformer winding connected across the emitter of the first and the base of the second transistor, the associated primary winding constituting part of a smoothing circuit for the chopped output voltage of the second transistor. The input circuit of the first transistor may further include a Zener diode connected between its emitter and its base in order to limit the base current and therefore the collector current passing this transistor. Since this collector current must in its entirety pass through the emitter of the second transistor, in contradistinction to the arrangements shown in the two aforementioned commonly owned applications in which the second transistor is provided with its own independent input circuit from another transformer secondary, the first transformer in its blocked condition effectively cuts off the second transistor and insulates it from any transient voltage appearing in the input of the chopper. The insertion of the high-ohmic resistor in the conductive connection between the two bases virtually prevents any discharge of the capacitive branch of the interstage coupling network through the emitter and base of the second transistor.

The above and other features of our invention will be described hereinafter in greater detail with reference to the accompanying drawing the sole FIGURE of which diagrammatically illustrates a representative embodiment.

The supply network shown in the drawing comprises a source of alternating input voltage $V_{in}$ constituted, for example, by a utility outlet of 220 v. RMS. This voltage, connected across the network by a manual switch not shown, is rectified in a circuit RE shown to include a diode $D_1$, a pair of series resistors $R_1$, $R_2$ and a pair of shunt condensers $C_1$, $C_2$. The output terminal B of this RC network is grounded through a starting circuit CS including a condenser $C_3$, a diode $D_2$ and a further condenser $C_4$ in series, the junction D between condenser $C_3$ and diode $D_2$ being grounded through a load resistor $R_L$ across which a reduced output voltage $V_{out}$ is developed; the series combination of condenser $C_3$ and load resistor $R_L$ is shunted by another resistor $R_3$.

Point B is connected via an adjustable current-limiting resistor $R_4$ to the emitter of a first transistor $Q_1$, shown to be of the PNP-type, whose collector is coupled by way of a differentiation circuit $C_5$, $R_5$ to the emitter of a similar second transistor $Q_2$; the output terminal C of transistor $Q_2$, joined to the collector thereof, is connected to a terminal of a primary winding P of a transformer $Tr_1$ whose other terminal is tied to the junction of diode $D_2$ and condenser $C_4$. Transistors $Q_1$ and $Q_2$ form part of a chopper stage generally designated CH.

Transformer $Tr_1$ has two secondary windings $S_1$ and $S_2$. Secondary $S_1$ has a first terminal connected to point B in the input of chopper CH, its second terminal being connected to the base of transistor $Q_2$. The bases of the two transistors are interconnected by a high-ohmic resistor $R_6$, the base of transistor $Q_1$ being further connected to point B through a Zener diode $D_z$ so poled as to limit the magnitude of the positive voltage peaks appearing in the input of chopper CH. Secondary $S_2$ supplies a stepped-up voltage, by way of a rectifying circuit here simply represented by a diode $D_3$, to a high-voltage anode of an associated cathode-ray tube not further illustrated, this tube being provided with the usual scanning means including a horizontal sweep-control circuit SC and an electromagnetic yoke simply shown as a coil $L_y$ in series with an adjustable choke L. Sweep-control circuit SC comprises a storage condenser $C_6$ connected, in series with coils L and $L_y$, between ground and a tap A on transformer primary P, this series combination being further shunted by a flyback condenser $C_7$ of substantially lower capacitance than condenser $C_6$, a diode $D_4$, and the emitter-collector circuit of an auxiliary transistor $Q_3$ whose base and emitter periodically received synchronizing pulses $sp$ from a source not shown by way of a transformer $Tr_2$. Owing to the autotransformer action of primary P, the voltage difference between points A and D is less than that between points C and D; by interchanging the connections extending from chopper CH and circuit SC to primary P, as shown in the aforementioned applications, a step-up rather than a stepdown ratio may be obtained between points A–D and C–D.

When the system is first connected across source $V_{in}$, the resulting voltage surge at point B drives the tap A positive, thereby charging the initially discharged condensers $C_6$ and $C_7$ through the reactive starting circuit CS and the primary P over a path bypassing the blocked transistors $Q_1$, $Q_2$. This charging step is significant only during cut-in since, as will presently become apparent, the condensers $C_6$ and $C_7$ are periodically recharged through the chopper CH during steady-state operation.

Let us consider a time when the electronic switch constituted by transistor $Q_3$ is closed by an unblocking pulse $sp$. A current $i_y$ passes at this instant through yoke $L_y$ in the direction indicated by an arrow (taken as positive), thereby discharging the condenser $C_6$ through transistor $Q_3$ at a rate determined by the resonance frequency of the tuned series circuit $L_y$, L, $C_6$. As soon as pulse $sp$ terminates, transistor $Q_3$ cuts off whereupon the yoke current $i_y$ flows into condenser $C_7$ which charges up at a rate depending on the resonance frequency of series reactances $L_y$, L, $C_7$ (it being assumed that the capacitance of condenser $C_6$ is so much larger than that of condenser $C_7$ as to have only a negligible effect upon the charging of the latter). This charging of condenser $C_7$, by a current flow $i_f$, begins to raise the potential of point A whereby a current surge $i_p$ through primary P is initiated, the direction of this surge (arrow) being here taken as positive. This surge, in turn, gives rise to a secondary current $i_s$ in winding $S_1$, thereby unblocking the transistors $Q_1$, $Q_2$ effectively operating in the grounded-base mode. The current flow through the transistors is differentiated by the circuit $C_5$, $R_5$, the resultant flow of collector current $i_c$ sharply raising the potentials of points A and C. Owing to its grounded-base connection, transistor $Q_2$ has a very high cut-in voltage protecting it against spurious breakdowns.

As soon as the flyback current $i_f$ stops, primary current $i_p$ reverses and secondary current $i_s$ ceases. Owing to the finite sweep-out time of transistors $Q_1$ and $Q_2$, however, the flow of collector current $i_c$ continues for a short period, condenser $C_7$ meanwhile discharging through inductances L, $L_y$ and capacitor $C_6$. The flow of negative yoke current $i_y$ continues thereafter by way of diode $D_4$ which becomes conductive as soon as point A is driven negative, with reference to ground, by the inverted flyback current. At this stage, however, the yoke current is again controlled by the reactances L, $L_y$, $C_6$ to the exclusion of the capacitance $C_7$ which has been short-circuited by the diode $D_4$. Thus, the substantially linear rise in yoke current is more gradual than its descent during the flyback interval.

At some point between the end of that flyback interval and the instant when current $i_y$ goes to zero, a new synchronizing pulse $sp$ appears in the input of switching transistor $Q_3$. The resulting unblocking of this transistor takes effect, however, only upon the reversal of the yoke current whereupon this current again flows through the transistor as previously described, the cycle being then repeated.

Impedances P, $C_4$ and $R_L$ represent an integrating circuit which substantially maintains the load voltage $V_{out}$, i.e. the potential of point D, at an average level of, say 30 v.

The potential of points A and C is not changed during the forward sweep of the beam so that the linearity of that sweep inherent in the design of the control circuit SC is not affected.

The output voltage $V_{out}$ may be used to control the vertical beam deflection, to energize the generator of synchronizing pulses $sp$ and to drive other equipment in the audio or video channels of the television receiver containing the aforementioned cathode-ray tube. Naturally, transformer $Tr_1$ may have additional secondary windings leading to other loads and, if desired, inductances similar to coil $L_y$ may be energized in parallel therewith or may be included in other series-resonant circuits branched across condenser $C_7$.

With a conventional germanium power transistor used as the chopping transistor $Q_2$, our system has been found particularly suitable for transistorized television receivers of screen sizes up to about 12 inches.

We claim:

1. A power-supply network for converting a continuous supply voltage into a reduced continuous output voltage, comprising an input circuit connected to receive said supply voltage, a load circuit, a first transistor and a normally blocked second transistor or like conductivity type connected in series between said input circuit and said load circuit, control means for periodically energizing said first transistor to unblock said second transistor, thereby generating a pulse train in the output of said second transistor, and impedance means inserted between said second transistor and said load circuit for generating the reduced output voltage; each of said transistors having a base, an emitter and a collector, the bases of said transistors being conductively interconnected, said transistors being provided with coupling means connecting the collector of said first transistor to the emitter of said second transistor, the emitter of said first transistor being connected to said input circuit, the collector of said second transistor being connected to said impedance means, said control means being connected between the emitter of said first transistor and the base of said second transistor; said impedance means comprising a primary winding and said control means comprises a secondary winding inductively coupled to said primary winding, the latter being connected to the collector of said second transistor for energization thereby.

2. A network as defined in claim 1, further comprising a high-ohmic resistor in the conductive connection between said bases and a Zener diode connected across said secondary winding in series with said resistor, said Zener diode being further connected between the base and the emitter of said first transistor in a sense limiting the emitter-base voltage thereof.

3. A network as defined in claim 2, further comprising adjustable resistance means inserted between said Zener diode and the emitter of said first transistor for limiting the current flow through said emitter.

4. A network as defined in claim 1, wherein said load circuit comprises part of a television receiver provided with a sweep circuit including a source of synchronizing pulses, said primary winding being connected at least in part across said sweep circuit for energization in the rhythm of said synchronizing pulses.

5. A network as defined in claim 4, wherein the collector of said second transistor is connected to a terminal of said primary winding and said sweep circuit has an output connection to an intermediate tap of said primary winding.

6. A network as defined in claim 1, further comprising an integrating circuit for smoothing said reduced output voltage, said primary winding forming part of said integrating circuit.

7. A network as defined in claim 6, wherein said coupling means comprises a differentiation circuit with parallel capacitive and resistive branches.

* * * * *